United States Patent

[11] 3,582,822

| [72] | Inventor | James L. Karney |
| | | Oxnard, Calif. |
| [21] | Appl. No. | 777,812 |
| [22] | Filed | Nov. 21, 1968 |
| [45] | Patented | June 1, 1971 |
| [73] | Assignee | The United States of America as represented by the Secretary of the Navy |

[54] LASER FLASH TUBE
1 Claim, 7 Drawing Figs.

[52] U.S. Cl. .................................................. 331/94.5, 313/46, 313/110, 313/220
[51] Int. Cl. ...................................................... H01s 3/09
[50] Field of Search .......................................... 331/94.5

[56] References Cited
UNITED STATES PATENTS

| 3,399,359 | 8/1968 | Ott et al. | 331/94.5 |
| 3,413,567 | 11/1968 | Hannwacker et al. | 331/94.5 |
| 3,480,877 | 11/1969 | Dillon et al. | 331/94.5 |
| 3,487,332 | 12/1969 | Cordy | 331/94.5 |

Primary Examiner—Roy Lake
Assistant Examiner—Darwin R. Hostetter
Attorneys—Edgar J. Brower, Q. Baxter Warner and Howard J. Murray, Jr.

ABSTRACT: The present concept is directed to an improved laser pumping source, or flash tube, which is normally located adjacent a rod of lasing material within a cavity having a highly reflective inner surface. Since large amounts of heat are generated, the maximum operating temperature of the unit has been limited by the melting point of the materials which seal the various sections making up the enclosure. Disclosed is a sealing technique whereby the maximum operating temperature may be raised as high as 800°C. In addition, the configuration of the cavity is modified so that a larger percentage of the energy emitted by the flash tube reaches the lasing material thus improving the overall efficiency of the assembly.

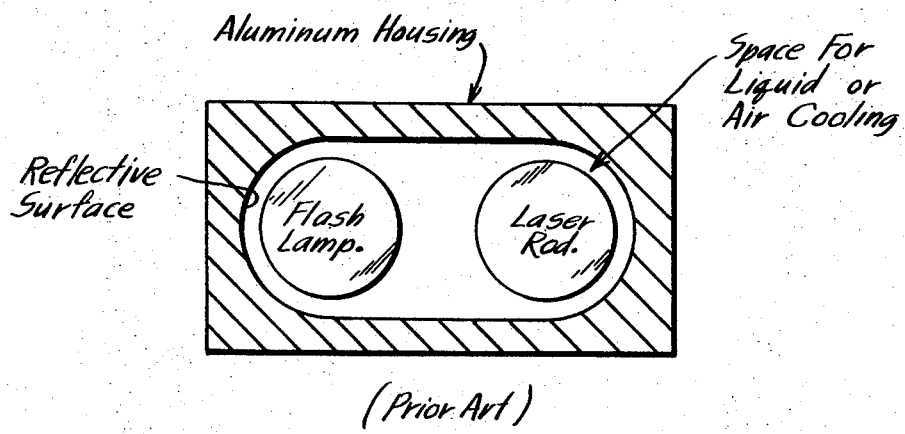
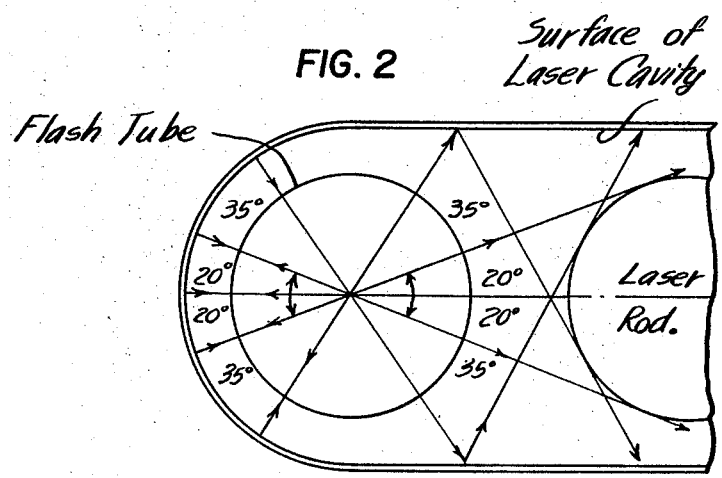
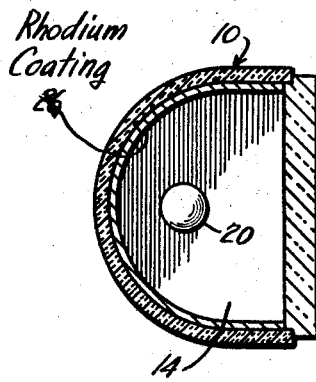
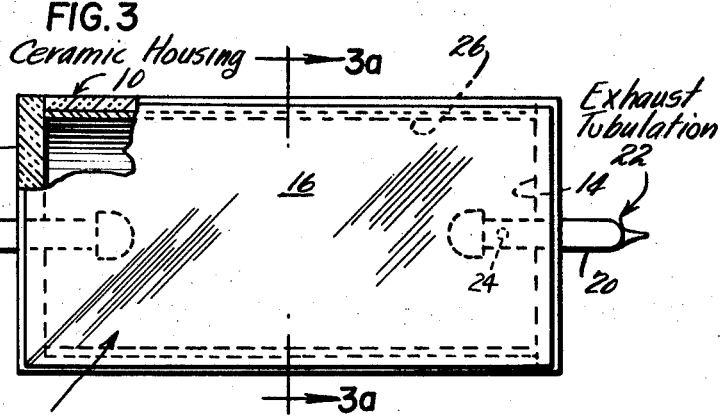

JAMES L. KARNEY
INVENTOR.

LASER FLASH TUBE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

When a laser rod is excited by energy emitted from a flash lamp, a beam of coherent light may be produced in a manner now well known in the art. However, such a flash lamp must be capable of "pumping" the atoms of the material composing the rod, so that, in effect, energy is channeled or funneled from a broadband incoherent source into monochromatic coherent radiation of a discrete frequency. In this process, considerable amounts of heat are generated, and, unless precautionary steps are taken to maintain the operating temperature below a critical level, both the efficiency of the assembly and its life span can be adversely affected. The main problem resides in the nature of the electrode seals, and it has been found that solder seals are damaged by temperatures in excess of approximately 200° C., while other standard types of metal-to-glass seals can withstand heat up to only about 400° C. Inasmuch as a unit of the type being discussed operates more efficiently in the range of 900° to 1,200° C., it is apparent that present sealing techniques are inadequate for optimum laser performance. In order to maintain the temperature of the laser cavity below the point at which damage to the seals would occur, the unit is customarily cooled either by water or by forced air. However, the latter expedient is effective only at low input levels, and when a quartz flash tube is pulsed in excess of 3 to 5 pulses per second at 30 joules per pulse (300 to 500 watts) temperature gradients greater than 1,000° C. are developed through the tube. This results in quartz vaporization from plasma discharge and tube softening, a condition which quickly destroys the tube regardless of the circulating air. When liquid coolants are employed, degradation and contamination of the liquid from ultra-violet radiation occurs, and furthermore the additional weight, complexity, and power requirements are at least undesirable and in many cases can not be tolerated.

A further disadvantage possessed by many known designs for laser cavities is that only a relatively small proportion of the energy output of the flash tube is received by the lasing substance either directly or following reflection from the cavity surface. Expressed differently, there is little or no focusing action present, and of the total radiated power only about 30 percent actually reaches the laser material. The remainder is dissipated as heat either in the cavity walls or in the flash tube itself. As a result, cavity heating becomes a problem secondary only to that of adequate sealing.

Even more important than the low operating efficiency of many known laser arrangements is their lack of reliability. At present the key item limiting MTBF (mean time between failures) is the flash tube, the normal life expectancy of which is about 150 thousand flashes before replacement is necessary. This figure could be raised significantly if some method were available to utilize a greater percentage of the potential energy generated by the flash tube and to provide means for operating the assembly within a more efficient temperature range without damage to the components thereof.

SUMMARY OF THE INVENTION

In accordance with a feature of the present concept, the configuration of a conventional laser cavity is modified so that a relatively high percentage of the energy emitted by the flash tube is received by the lasing material, thereby significantly improving the overall efficiency of the unit. In addition, an improved sealing technique is disclosed as a result of which operation at temperatures as high as 2,000° C. is possible without damage from internal vaporization. Still further, a novel cooling method is utilized in which excess heat from the flash tube is transferred to a dissipating unit and thence to a thermal radiating member from which the excess heat is "dumped" into the ambient air. Since the cavity is sealed, no contaminants are present therein, and the life of the unit is prolonged to a marked degree.

STATEMENT OF THE OBJECTS OF INVENTION

One object of the present invention, therefore, is to provide an improved design for a laser cavity as a result of which the operating efficiency of the unit is increased.

A further object of the invention is to provide an improved sealing technique for a laser cavity whereby the operating temperature of the assembly may be raised without adverse effect on the components thereof.

An additional object of the invention is to provide an improved method of dissipating excess heat from a laser cavity without employing either liquid or forced air cooling.

A still further object of the invention is to provide a laser cavity wherein a significant portion of the energy emitted by a flash lamp is focused onto a lasing substance so as to bring about an excitation thereof.

Other objects, advantages, and novel features of the invention will become apparent from the following detailed description of the invention when considered in conjunction with the accompanying drawings.

BRIEF DESCRIPTION OF THE DRAWINGS

FIG. 1 is a sectional view of a laser cavity as now known in the art, illustrating the relative positioning of a flash tube and a laser rod to be energized thereby;

FIG. 2 is a schematic view illustrating the manner in which flash tube energy is distributed in the conventional arrangement of FIG. 1;

FIG. 3 and 3a are plan and sectional views, respectively, of a laser flash tube designed in accordance with a preferred embodiment of the present invention;

DESCRIPTION OF THE PREFERRED EMBODIMENT

Figure 4:
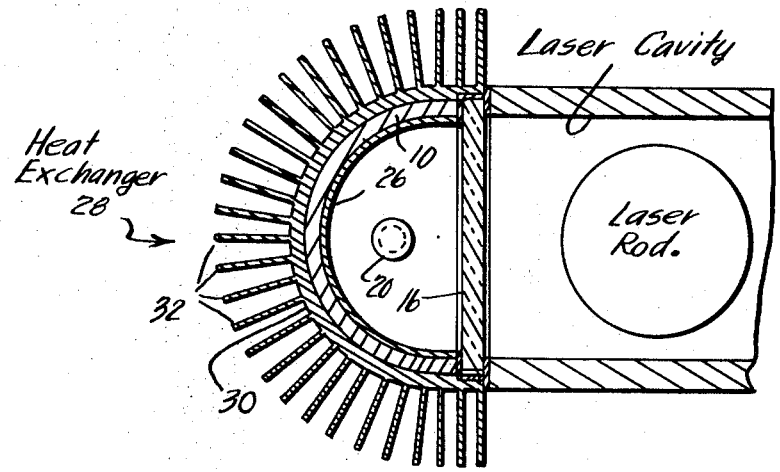
FIG. 4 is a cross-sectional view of a portion of a laser cavity to which has been added a flash tube designed in accordance with the showing of FIGS. 3 and 3a, together with a heat exchanger in the form of a plurality of fins extending radially outwardly therefrom.

In FIG. 1 of the drawings is shown in cross section a laser cavity of a type now standard in the art. As illustrated, a flash lamp and a laser rod are positioned in spaced-apart relationship within a housing formed of aluminum or some other suitable material having a highly reflective inner surface. An open space is provided between the components in order that the assembly may be cooled either by circulation of liquid or forced air.

A major disadvantage possessed by a cavity configured as shown in FIG. 1 is that a large part of the radiated flash tube energy not directly received by the laser rod is dissipated through absorption and by multiple reflections from the cavity and flash tube surfaces. Such energy is therefore lost insofar as pumping the lasing material is concerned, and the efficiency of the assembly is reduced in proportion to the magnitude of this lost energy. The following table when considered in conjunction with FIG. 2 of the drawings, brings out the serious nature of the problem, recognizing that the pumping bands for typical laser rods occur within the wavelength region of $0.3\mu$ to $1.1\mu$:

ENERGY DISTRIBUTION FOR CONVENTIONAL FLASH LAMP OF FIG. 1

|  | Direct | One refl. | Two refl. flash tube twice | One refl. flash tube twice | Random | >2 refl. >2 passes thru tube |
|---|---|---|---|---|---|---|
| Total angles, degrees | 40 | 70 | 70 | 40 |  | 140 |
| Percent radiated energy (watts) | 11.1 | 19.5 | 19.5 | 11.1 |  | 39.0 |
| Percent lamp conversion efficiency at 50% (300 watt input) | 150 | 150 | 150 | 150 |  | 150 |
| Percent energy lost by cavity reflection |  | (.95) | (.95)² | (.95) |  | (.95)²+(.95)³ |
| Percent energy lost by tube abs. and refl |  |  | (.05)² + (.035)² | (.05)² + (.035)² | $\left[\dfrac{(.035)^2}{(.035)^3}\right]+\left[\dfrac{(.05)^2}{(.05)^3}\right]$ |  |
| Energy received at rod (watts) | 16.5 | 27.8 | 20 | 13.8 |  | 13+13=26 |

NOTE: Cavity reflectivity=95%; flash tube absorption=5%; flash tube reflectivity=3.5% each pass; conversion efficiency 50% from .35μ to 1.1μ.

Not all of the electrical power supplied to the flash tube is converted into optical radiation, about 50 percent being so converted in the $0.3\mu$ to $1.1\mu$ region. Therefore, assuming an input electrical power of 300 watts, only approximately 150 watts is usable as radiated energy. From the table and from FIG. 2 of the drawings it will be noted that the energy radiated by the flash tube which reaches the laser rod directly lies within an angle of approximately 40°. This constitutes about 11.1 percent of the total, or in the neighborhood of $(0.11)(150) \approx 16.5$ watts. Radiation emitted on either side of this cone (or from ±20° to ±55° to the direct ray) must reflect at least once from the cavity wall. The intensity of this reflected radiation is $(0.195)(150)(0.95) \approx 27.8$ watts reaching the laser rod.

From ±55° to ±90° on either side of the direct ray, the emitted energy must reflect from twice to many dozens of times before impinging on the rod. Each ray will be further attenuated on each "pass-back" through the flash lamp because of surface reflections and gas absorption. While no exact figure for such energy loss can be arrived at, an estimate of $(0.195)(150)(0.95)^2(1-0.05)^2(1-0.035)^2 \approx 20$ watts may be made for an upper limit of energy reading the rod. This value will vary considerably for angles greater than $\approx 70°$, and for $\approx 90°$ may well be below 1 watt. Consequently, the 20-watt figure given above may in practice be closer to 10—13 watts In similar fashion, for angles between $\approx 90°$ and $\approx 125°$ to the direct ray, radiation of about the same magnitude (that is, 10- —13 watts) may be estimated.

It is also necessary to consider energy reflected from the opposite or far side of the flash tube, as indicated in FIG. 2. Such radiation undergoes losses through reflection from both the cavity wall and quartz envelope as well as from each passage through the flash lamp itself. After deducting such losses, a valid estimate of the residual energy reaching the laser rod is 33.8 watts.

The total power thus available to pump the laser rod has an upper limit of about 103 watts. This is approximately 68 percent of 150 watts, for an overall efficiency rating of 34 percent when the 300-watt input is considered. However, since not all flash tube radiation subtends an optical line-of-sight to the laser rod, there are nonradial components present as well as end effects, and such radiation (which never reaches the rod) may well account for an additional 10 percent energy loss. All of this energy not absorbed by the rod is of course converted into cavity heating and flash tube heating. Therefore, with a total efficiency rating of 30 percent or lower, internal heating becomes an obviously serious problem when the input power exceeds about 250 watts, usually requiring some method of liquid cooling with its attendant disadvantages as briefly set forth above.

The present invention overcomes the above drawbacks by providing a flash tube assembly having both improved design and construction. As best shown in FIGS. 3 and 3a of the drawings, the usual quartz envelope of FIG. 1 is replaced by a ceramic housing member 10 of high thermal conductivity. Rather than being generally semicylindrical in cross section, as is that portion of the cavity surface adjacent the flash lamp in the known construction of FIG. 1, the corresponding surface of the housing member 10 of FIGS. 3 and 3a is chosen to obtain an output beam divergence of approximately 1.5°. This will be further discussed in connection with FIG. 6 of the drawings. For the present it is sufficient to state that the ceramic housing member 10 is closed by two electrode-supporting end walls 12 and 14 and by a planar window 16 transparent to the energy developed by connecting the tungsten electrodes 18 and 20 to a source of electrical power (not shown). These electrodes are respectively supported and positioned by the end walls 12 and 14, so that the members 10, 12, 14 and 16 together constitute an enclosure within which a plasma discharge can be established, with radiation therefrom passing through the window 16.

A preferred composition for the high thermal conductivity ceramic housing member 10 (as well as for the end walls 12 and 14) is one containing about 94 percent alumina-silicate or beryllia, and the transparent window 16 should preferably be pure sapphire. With these materials, it is possible to employ an available ceramic-to-sapphire fusing process to seal the entire unit. Furthermore, by controlling the ceramic composition, a thermal conductivity up to 1 watt/cm/°K. can be obtained. When the sapphire window 16 is included, the overall thermal conductivity is approximately 20 times greater than the best grade of quartz (0.05 watts/cm/°K.) employed in the known design of FIG. 1.

The tungsten electrodes 18 and 20 are welded or brazed directly into the ceramic end walls 12 and 14, respectively. This procedure not only provides electrical insulation but establishes a thermal path for heat generated at the electrode surfaces.

After construction of the assembly of FIGS. 3 and 3a, and during the outgassing step, the tube can be heated to the high temperature necessary to drive off contaminants and improve its life span. Such a procedure at present results in damage to solder seals. After outgassing, the tube of FIGS. 3 and 3a is filled with a suitable gas (such as Xenon) through the tubulation 22 in electrode 20, the gas entering the housing through an aperture 24 as illustrated.

The inner surface of the ceramic housing member 10 is provided with a high-reflectance coating 26 of some substance such as rhodium, which can be electrodeposited, if desired, over a base metal or, alternatively, directly on the ceramic material itself. It has been found in practice that this rhodium coating can withstand temperatures in excess of 800°C while maintaining high reflectivity in the range of $0.3\mu$ to $1.1\mu$.

High-density ceramics of the type herein discussed can be cast in wall thicknesses as low as 0.05 inch without losing their ability to seal gases therewithin. A preferable wall thickness for the housing 10 of FIGS. 3 and 3a lies between 0.05 inch and 0.075 inch. The overall length and electrode spacing are of course dictated by the size of the laser rod with which the tube is to be associated. Normally, such rods are from 3.5 inches to 4.5 inches long. The height of the assembly will usually range from 0.5 inch to over 1 inch.

Figure 5:
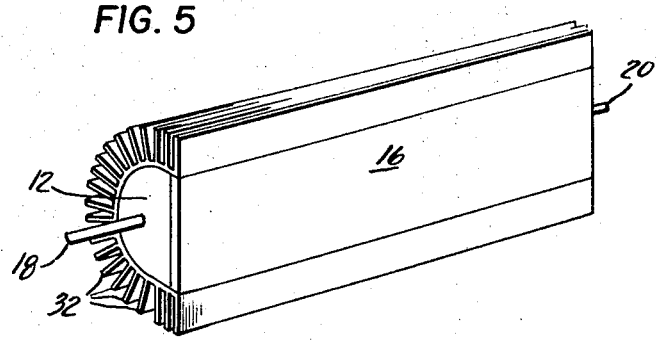
FIG. 5 is a perspective view of the flash tube of FIG. 4 with the heat exchanger attached thereto.

A flash tube designed in accordance with the present invention is capable of continuous free-air operation at a temperature of 800° C. and with an input of 500 watts without damage, the upper temperature limit being determined solely by the melting point of the braze weld (850° C.). When the unit is incorporated into a laser cavity, adequate thermal conduction can be made directly from the lamp surface to an external heat exchanger. In a manner not possible with the standard quartz lamp of FIG. 1, this heat exchanger (or heat sink) 28 can be bonded or brazed to the exterior of the housing 10, as shown in FIGS. 4 and 5 of the drawings. As there illustrated, the unit 28 consists of a hub 30 configured to fit the outer surface of housing 10, this hub 30 having a plurality of fins 32 extending radially outwardly therefrom to provide maximum surface exposure to the ambient air. The high degree of heat dissipation afforded by this design permits the laser cavity to remain sealed, thus avoiding the possibility of contamination by dust or moisture.

Figure 6:
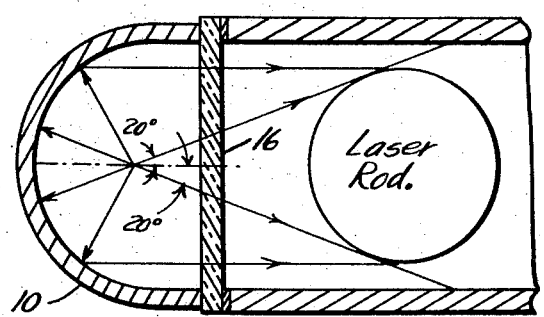
FIG. 6 is a schematic view illustrating the manner in which the energy distribution in the invention arrangement is improved over that shown in FIG. 2 for a conventional design.

Referring now to FIG. 6 of the drawings, there is shown one manner in which energy may be distributed from a flash lamp designed in accordance with the principles of the present invention. When this distribution pattern is compared with that of known arrangements as set forth in FIG. 2, it will be noted that, in the forward direction, emitted energy within an angle of 40° will be subtended at the laser rod in both cases, equal to approximately 16.5 watts. From ±2 0° to ±50° about the axial ray in FIG. 6, radiation from the flash tube undergoes one reflection from the interior cavity before reaching the rod. This equals approximately (0.167)(150)(0.95)=24.5 watts.

However, from ±50° to ±180° to the axial ray, emission from the flash tube undergoes only one reflection from the rhodium coated inner surface of the flash tube housing, and is subject to absorption by the gas filling the tube during only a single pass-through. Also, the emitted light passes only once through the sapphire window, and no reflection losses occur as with the quartz flash tube of FIG. 1 when rays enter and leave the envelope.

An upper limit of 82.5 watts may be calculated for the energy emitted between ±50° and ±180° which is incident on the laser rod in the design of FIG. 6. This yields a total of 123.5 watts of usable pumping energy for an electrical power input of 300 watts to the flash tube. For the standard design of FIG. 2, the total is only 103 watts, so that, by employing the invention teaching, the overall operating efficiency of the assembly is raised from about 30 percent to a figure of approximately 41.2 percent, an improvement of 11.2 percent.

Transmission of narrow pump bands absorbed by the active atoms in the laser rod may be brought about by adding to the sapphire material of the window 16 substances having selective absorption and/or reflection characteristics A "cool" light may then impinge the laser rod at the expense of converting the unused light energy to heat within the flash lamp. However, because a greater proportion of this heat can be removed by employing the invention teaching, the laser rod is protected from the damage to which it would otherwise be subjected. In any case, only about 1 percent of the incident energy between $0.3\mu$ and $1.1\mu$ is absorbed by the active atoms of the rod in narrow bands, the remainder being converted to heat within the rod.

Other advantages can be obtained by practicing the invention herein disclosed. For instance, other lasing materials can be employed, such as neodymium-doped glass. This gives excellent lasing action, but has the disadvantages of bifringence, thermal focusing, and limited frequency of pulse production. Normally, these characteristics restrict its use to systems requiring pulse rates below 10 pulses/sec. With the higher percentage of pumping energy available in the arrangement herein set forth, use of such a lasing material becomes feasible in many environments where it was previously unsuitable.

It will be appreciated that, if desired, the sapphire window 16 of FIGS. 3 thru 6 may be formed in the shape of a cylindrical lens having a radius of curvature of, say, one-half inch. This would produce a focusing effect and increase the density of the radiation received by the laser rod, thereby reducing the possibility of filamentary lasing near the periphery thereof.

Obviously a pair of flash lamps of the type herein described may be utilized on either side of a laser rod rather than the single lamp illustrated in the drawings. This expedient would make the assembly more closely simulate a purely isotropic radiator. However, in most cases a single lamp is sufficient as a pump source.

Obviously many modifications and variations of the present invention are possible in the light of the above teachings. It is therefore to be understood that within the scope of the appended claims the invention may be practiced otherwise than as specifically described.

I claim:

1. In apparatus for stimulating the emission of radiation, said apparatus including a solid state negative temperature medium of cylindrical form disposed within an elongated cavity having an open section extending longitudinally thereof and parallel to the axis of said cylindrical negative temperature medium, the improvement which comprises:
   a focused source of optical pumping energy for stimulating the emission of radiation from said negative temperature medium, said focused source of optical pumping energy being made up of:
   a. an elongated housing member composed of ceramic material and designed for association with the elongated cavity within which said negative temperature medium is disposed, the inner surface of said housing member being rhodium coated and defining in cross section that portion of an ellipse proximate one focal point thereof,
   said elongated housing member designed to abut said elongated cavity so as to produce an effective closure of the respective open sections of said member and said cavity,
   b. a planar wall member composed of sapphire and disposed intermediate said housing member and said elongated cavity at their point of abutment,
   c. a pair of electrodes one of which is formed with an exhaust tubulation,
   d. a pair of electrode-supporting members respectively supporting said pair of electrodes and respectively closing the open ends of said elongated housing member,
   said electrode-supporting members, together with said planar wall member, forming with said housing member a closed chamber into which said electrodes protrude, and
   e. an ionizable gas filling such closed chamber,
   whereby, when the gas filling said chamber is ionized by application of a suitable potential across said electrodes, optical energy will be pumped from said source through said wall member to be received by said negative temperature medium,
   the configuration of the inner wall of said housing member being such that between one-third and one-half of the optical energy emitted by said source is received by said negative temperature medium without such emitted energy undergoing more than one reflection from the inner surface of said housing member prior to impingement upon the surface of said negative temperature medium to thereby stimulate the emission of radiation therefrom, and
   f. a heat exchanger surrounding said elongated housing member, said heat exchanger acting to dissipate into the ambient air at least a portion of the heat produced during emission of radiation by said negative temperature medium,
   said heat exchanger comprising a hub directly contacting the outer surface of said housing member, said hub having a plurality of fins extending radially outwardly therefrom.